(12) United States Patent
Hsiao (10) Patent No.: US 11,705,599 B2
(45) Date of Patent: Jul. 18, 2023

(54) BATTERY ACCOMMODATION MODULE

(71) Applicants: Inventec (Pudong) Technology Corporation, Shanghai (CN); INVENTEC CORPORATION, Taipei (TW)

(72) Inventor: Chi-Cheng Hsiao, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 121 days.

(21) Appl. No.: 17/341,803

(22) Filed: Jun. 8, 2021

(65) Prior Publication Data

US 2022/0294061 A1 Sep. 15, 2022

(30) Foreign Application Priority Data

Mar. 12, 2021 (CN) .......................... 202110272067.0

(51) Int. Cl.
*H01M 50/244* (2021.01)
*H01M 50/251* (2021.01)
*H01M 50/204* (2021.01)

(52) U.S. Cl.
CPC ....... *H01M 50/244* (2021.01); *H01M 50/204* (2021.01); *H01M 50/251* (2021.01); *H01M 2220/10* (2013.01)

(58) Field of Classification Search
CPC .................................................. H01M 2220/10
See application file for complete search history.

(56) References Cited

U.S. PATENT DOCUMENTS

| 2016/0093933 A1* | 3/2016 | Iida ..................... H01M 10/615 429/71 |
| 2020/0067037 A1* | 2/2020 | Zeng .................... H01M 50/211 |

\* cited by examiner

*Primary Examiner* — Matthew T Martin
*Assistant Examiner* — Ankith R Sripathi
(74) *Attorney, Agent, or Firm* — Locke Lord LLP; Tim Tingkang Xia, Esq.

(57) ABSTRACT

This disclosure relates to a battery accommodation module is configured to accommodate a plurality of batteries. The battery accommodation module includes a base container and at least one add-on container. The base container has a first accommodation space configured to accommodate one of the plurality of batteries. The at least one add-on container has a second accommodation space configured to accommodate another one of the plurality of batteries. One of the at least one add-on container is detachably engaged with the base container to cover the first accommodation space.

9 Claims, 7 Drawing Sheets

BATTERY ACCOMMODATION MODULE

CROSS-REFERENCE TO RELATED APPLICATIONS

This non-provisional application claims priority under 35 U.S.C. § 119(a) on Patent Application No(s). 202110272067.0 filed in China, P.R.C. on Mar. 12, 2021, the entire contents of which are hereby incorporated by reference.

BACKGROUND OF THE INVENTION

Technical Field of the Invention

The present disclosure relates to a battery accommodation module, more particularly to a battery accommodation module capable of fitting batteries of a required number.

Description of the Related Art

In order to pursue a stable power supply for some important electronic devices such as servers, these electronic devices may be powered by mains electricity and electric batteries at the same time. During an unplanned power interruption, the batteries can provide the device power to store data into data storages to prevent it from missing. To arrange a set of batteries in a desired area within the server casing, a battery holder is provided.

Generally, the server casing may adapt a battery holder of large capacity in order to make it fit most applications as possible. But sometimes the battery holder has no need to load a full set of batteries, thus leaving an unused space within the battery holder. In other cases, the serve may need more batteries to keep up with the power requirement due to the increase of added-on devices, but the required number of batteries may have been exceeded the capacity of the battery holder. The above problems clearly show that the conventional battery holder lacks flexibility in response to the change of batteries.

SUMMARY OF THE INVENTION

The present disclosure provides a battery accommodation module capable of fitting batteries of a required number so as to provide a power suitable for application.

According to one aspect of the present disclosure, a battery accommodation module is configured to accommodate a plurality of batteries. The battery accommodation module includes a base container and at least one add-on container. The base container has a first accommodation space configured to accommodate one of the plurality of batteries. The at least one add-on container has a second accommodation space configured to accommodate another one of the plurality of batteries. One of the at least one add-on container is detachably engaged with the base container to cover the first accommodation space.

According to the battery accommodation module discussed above, by stacking the add-on container on the base container, the space of the battery accommodation module for accommodating the batteries is adjustable, thereby capable of adjusting provided power according to actual requirements.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Note that, for ease of understanding, components in the accompany drawings may not be in their actual scale. And, the terms in the specification such as top, upper, bottom, lower, front, and rear are only for illustration and not intended to limit the present disclosure.

Figure 1:
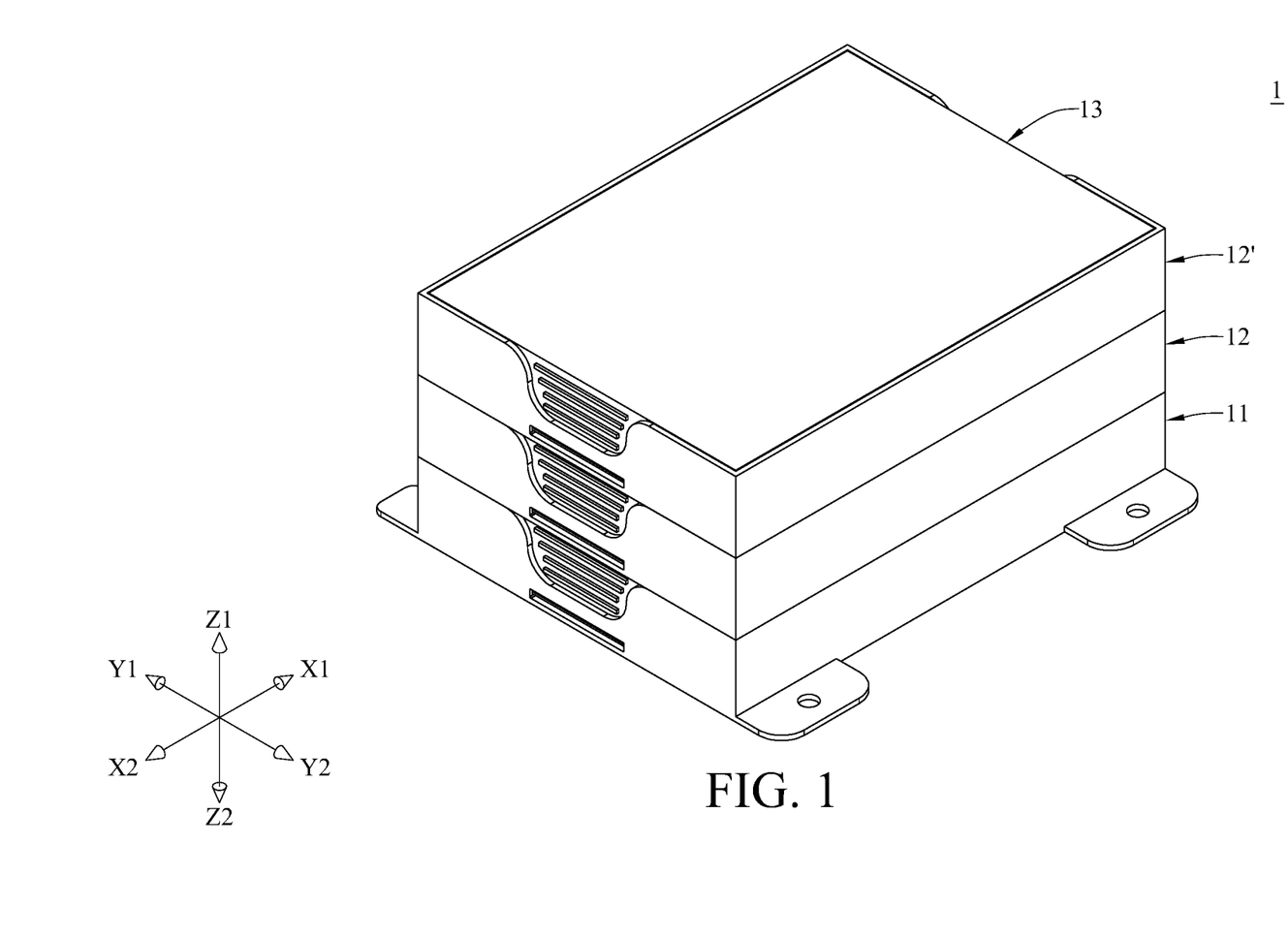
FIG. 1 is a perspective view of a battery accommodation module according to an embodiment of the present disclosure.
Figure 2:
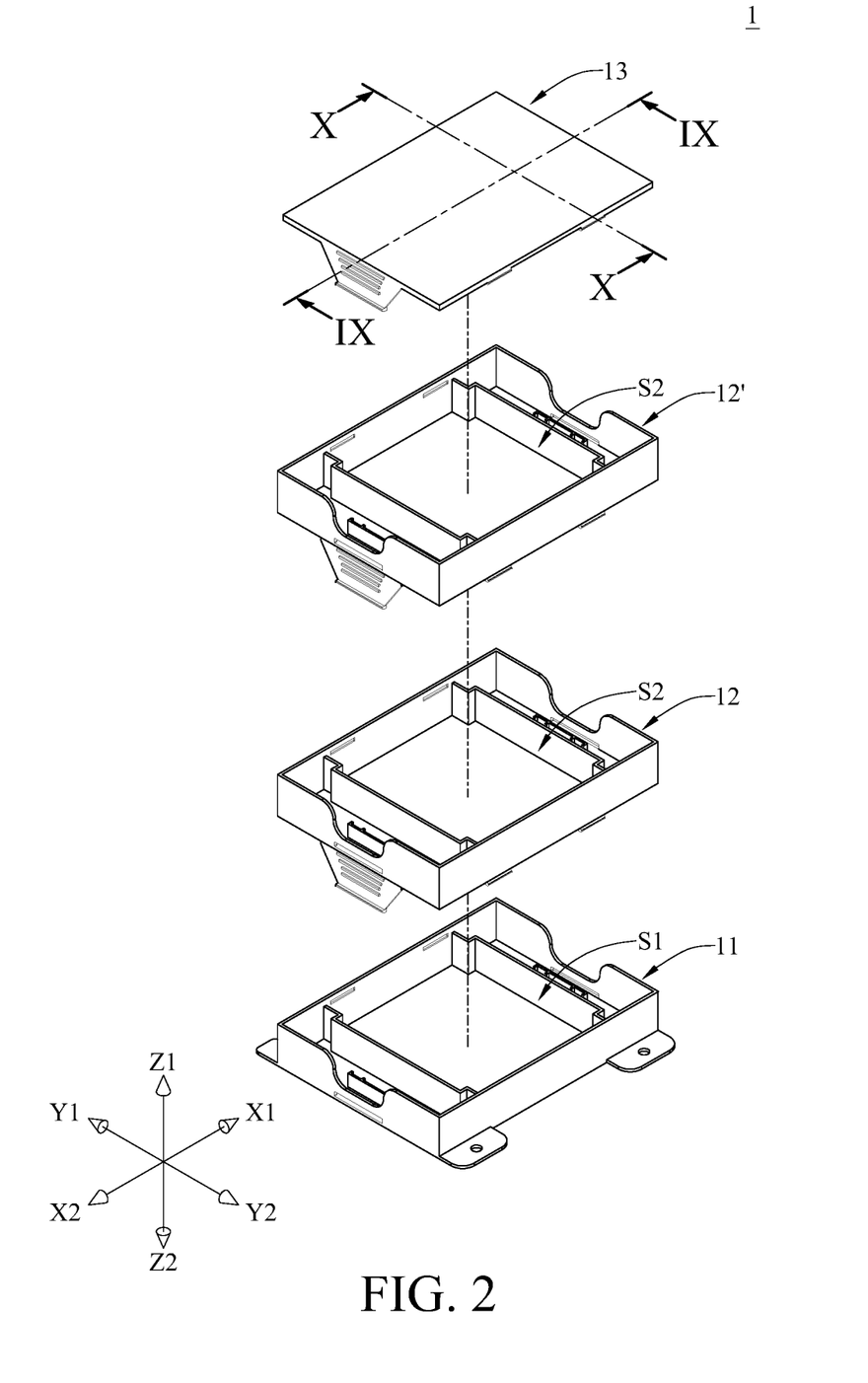
FIG. 2 is an exploded view of the battery accommodation module in FIG. 1.

Please refer to FIG. 1 and FIG. 2, where FIG. 1 is a perspective view of a battery accommodation module according to an embodiment of the present disclosure, and FIG. 2 is an exploded view of the battery accommodation module in FIG. 1. The battery accommodation module 1 is configured to accommodate one or more batteries (shown in FIG. 3 and FIG. 6) and may be installed in a casing of an electronic device for power supply. The aforementioned electronic device may be a server.

As shown in FIG. 1 to FIG. 2, the battery accommodation module 1 includes a base container 11, two add-on containers 12 and 12', and a cover 13. The base container 11 has a first accommodation space S1 configured to accommodate any suitable battery. Each of the add-on containers 12 and 12' has a second accommodation space S2 configured to accommodate any suitable battery. The add-on container 12 is detachably engaged with the base container 11 and covers the first accommodation space S1. The add-on container 12' is detachably engaged with the add-on container 12 and covers the second accommodation space S2 of the add-on container 12. The cover 13 is detachably engaged with the add-on container 12' and covers the second accommodation space S2 of the add-on container 12'. The arrangement of the base container 11 and the add-on containers 12 and 12' enables a plurality of batteries to be arranged along a straight direction (e.g., the directions Z1 and Z2 shown in the drawings. Note that the quantity of the add-on containers 12 and 12' in the battery accommodation module 1 is an example but not intended to limit the present disclosure. In some other embodiments, the battery accommodation module may include only one or more than two add-on containers.

Figure 3:
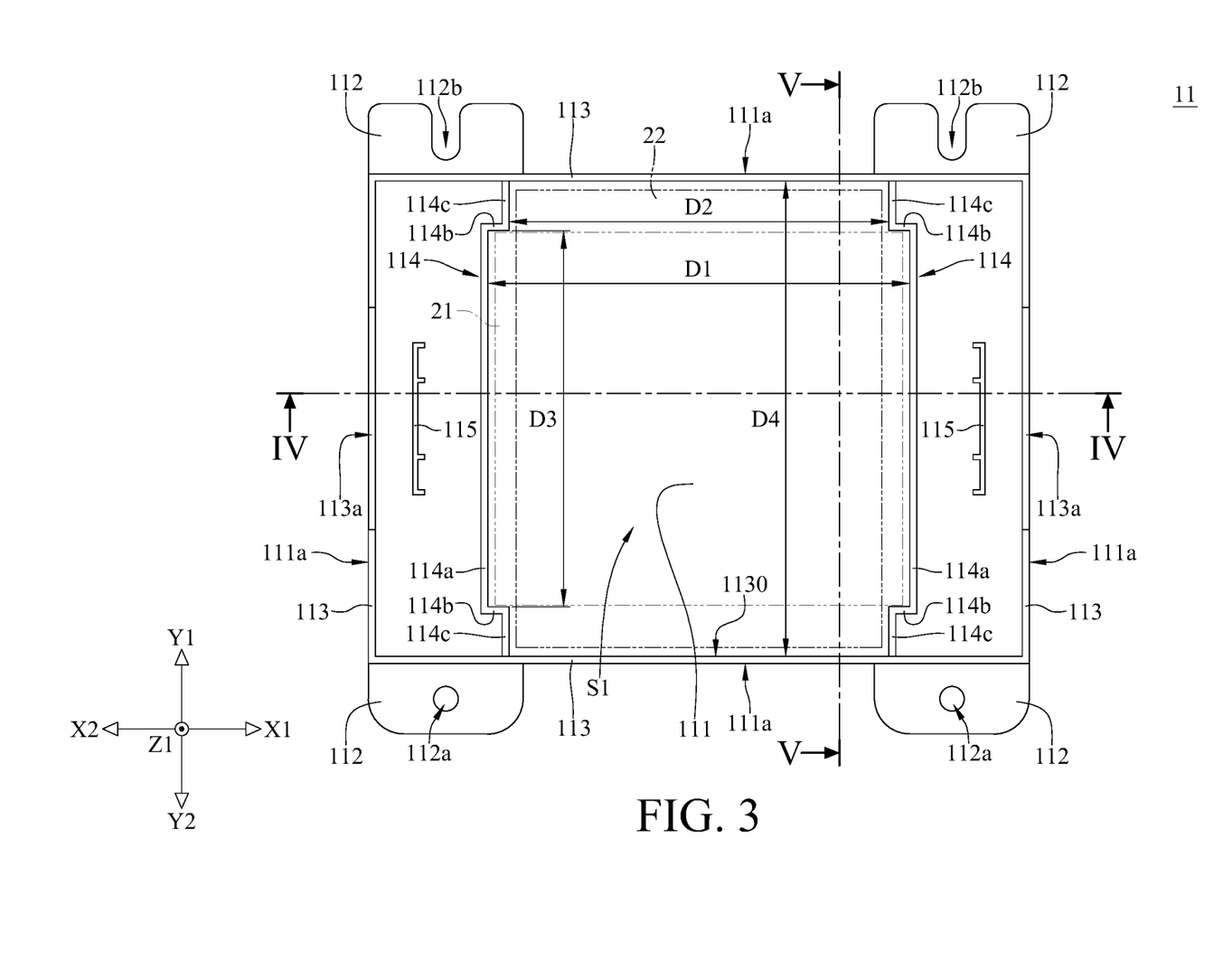
FIG. 3 is a top view of a base container of the battery accommodation module in FIG. 1.
Figure 4:
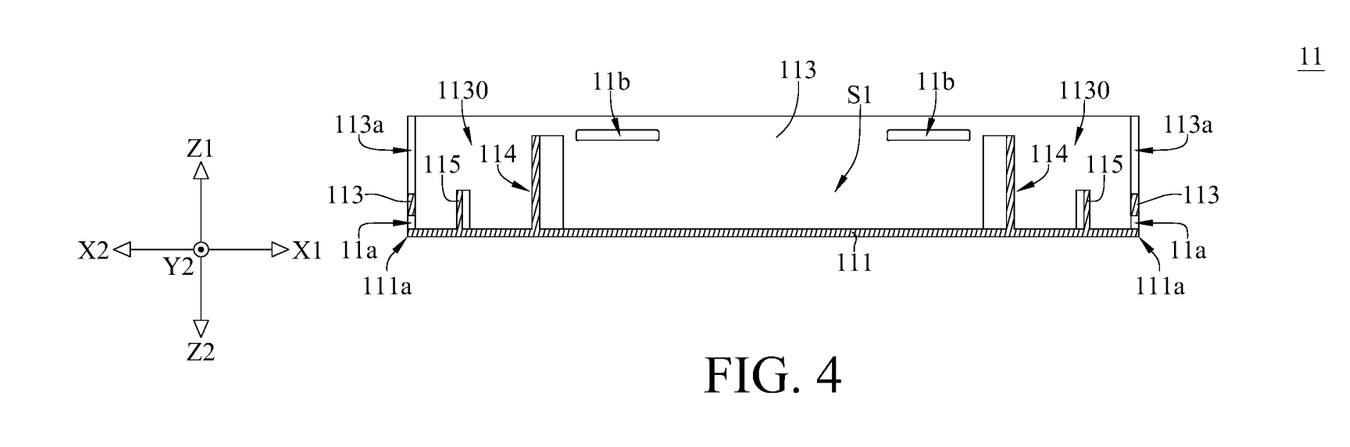
FIG. 4 is a cross-sectional view of the base container in FIG. 3 taken along line IV-IV.
Figure 5:
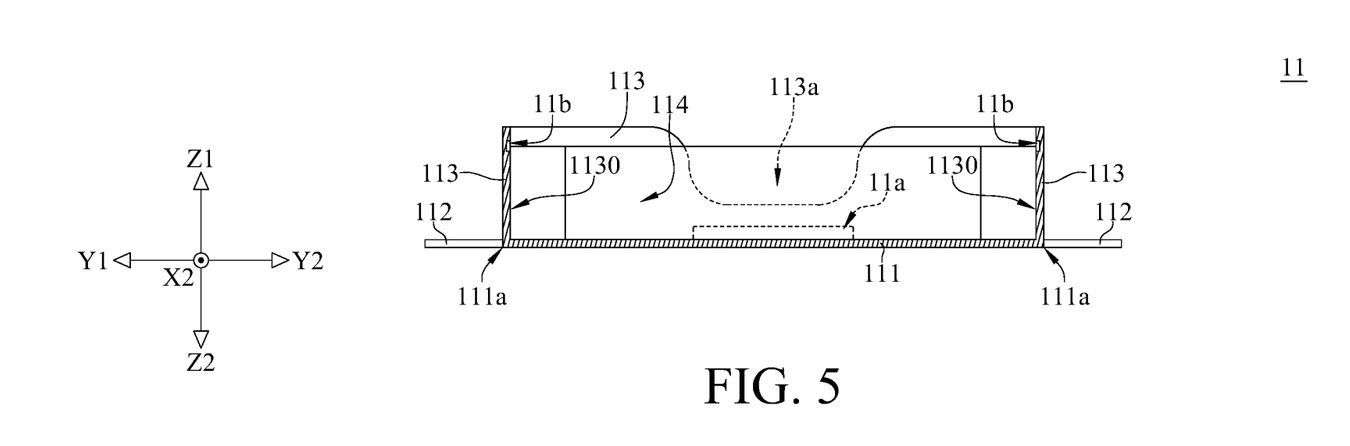
FIG. 5 is a cross-sectional view of the base container in FIG. 3 taken along line V-V.

Please refer to FIG. 3, FIG. 4, and FIG. 5, where FIG. 3 is a top view of a base container of the battery accommodation module in FIG. 1, FIG. 4 is a cross-sectional view of the base container taken in FIG. 3 along line IV-IV, and FIG. 5 is a cross-sectional view of the base container in FIG. 3 taken along line V-V.

In this embodiment, the base container 11 includes a first base plate 111, four mount tabs 112, a first lateral wall 113, two first retaining walls 114, and two first stoppers 115. The mount tabs 112 respectively extend outward from four corners (not numbered) of an edge 111a of the first base plate 111. Two of the mount tabs 112 at the same side of the edge 111a each have a through hole 112a, and the other two of the mount tabs 112 at another side of the edge 111a each have a groove 112b. The through holes 112a and grooves 112b are provided for insertion of any suitable screws that are fixed to the casing of the electronic device, such that the base container 11 can be fixed to the casing. In addition, the grooves 112b allow a short position adjustment of screws, helping the base container 11 to fit the screw holes of the casing.

The first lateral wall 113 extends outward from the edge 111a of the first base plate 111 and are substantially perpendicular to the first base plate 111. The first retaining walls 114 are substantially perpendicular to the first base plate 111 and are arranged along a direction (e.g., the directions X1 and X2 shown in the drawings). The first lateral wall 113 surrounds the first retaining walls 114. The first retaining walls 114, the first base plate 111, and the first lateral wall 113 form the first accommodation space S1, where the first accommodation space S1 may have a cross shape since the specific shape of the first retaining walls 114.

In specific, the first retaining walls 114 each include a first central part 114a, two first bent parts 114b, and two first outward extension parts 114c. In each first retaining wall 114, the first central part 114a is connected to and located between the first bent parts 114b, and the first outward extension parts 114c are connected to the first central part 114a respectively via the first bent parts 114b, where the first bent parts 114b are substantially perpendicular to the first central part 114a and the first outward extension parts 114c. The distal ends (not numbered) of the first outward extension parts 114c are connected to the first lateral wall 113.

As shown in FIG. 3, in the direction X1 or X2, the first central parts 114a are spaced apart by a first distance D1, the first outward extension parts 114c of the different first retaining walls 114 are spaced apart by a second distance D2, where the second distance D2 is shorter than the first distance D1. In a direction that is perpendicular to the direction X1 or X2 (e.g., the directions Y1 and Y2 shown in the drawings), the first bent parts 114b of the same first retaining wall 114 are spaced apart by a third distance D3, the distal ends of the first outward extension parts 114c of the same first retaining wall 114 are spaced apart by a fourth distance D4, where the fourth distance D4 is longer than the third distance D3.

The above configuration and arrangement of the first retaining walls 114 allows the first accommodation space S1 to accommodate batteries of different sizes (e.g., a battery 21 and a battery 22 shown in dotted line). The first distance D1 and the third distance D3 may be respectively the same or slightly larger than the length and width of the battery 21, thus the battery 21 can be perfectly held and clamped by the first retaining walls 114. On the other hands, the fourth distance D4 and the second distance D2 may be respectively the same or slightly larger than the length and width of the battery 22, thus the battery 22 can be perfectly held and clamped by the first retaining walls 114 and the first lateral wall 113.

As such, the base container 11 is able to hold either the battery 21 or the battery 22 in position. As shown, the base container 11 can prevent the battery 21 or 22 from moving in directions of X1, X2, Y1, and Y2 and therefore secure its position in the first accommodation space S1. In one embodiment, the battery 21 may have a length of about 58 millimeters (mm) and a width of about 53 mm, and the battery 22 may have a length of about 52 mm and a width of about 65 mm. Note that the sizes of the batteries are exemplary; in some other embodiments, the base container may support batteries in other sizes.

As shown in FIG. 4 and FIG. 5, the base container 11 has two first lower slots 11a and two first upper slots 11b. The first lower slots 11a are through slots located on the first lateral wall 113. The first uppers slots 11b are blind slots formed on inner surfaces 1130 of the first lateral wall 113. Moreover, the first lateral wall 113 has two first cut-outs 113a. The first lower slots 11a are located between the first cut-outs 113a and the first base plate 111. In addition, each of the first stoppers 115 is substantially perpendicular to the first base plate 111 and is located between one of the first cut-outs 113a and the first retaining walls 114.

Figure 6:
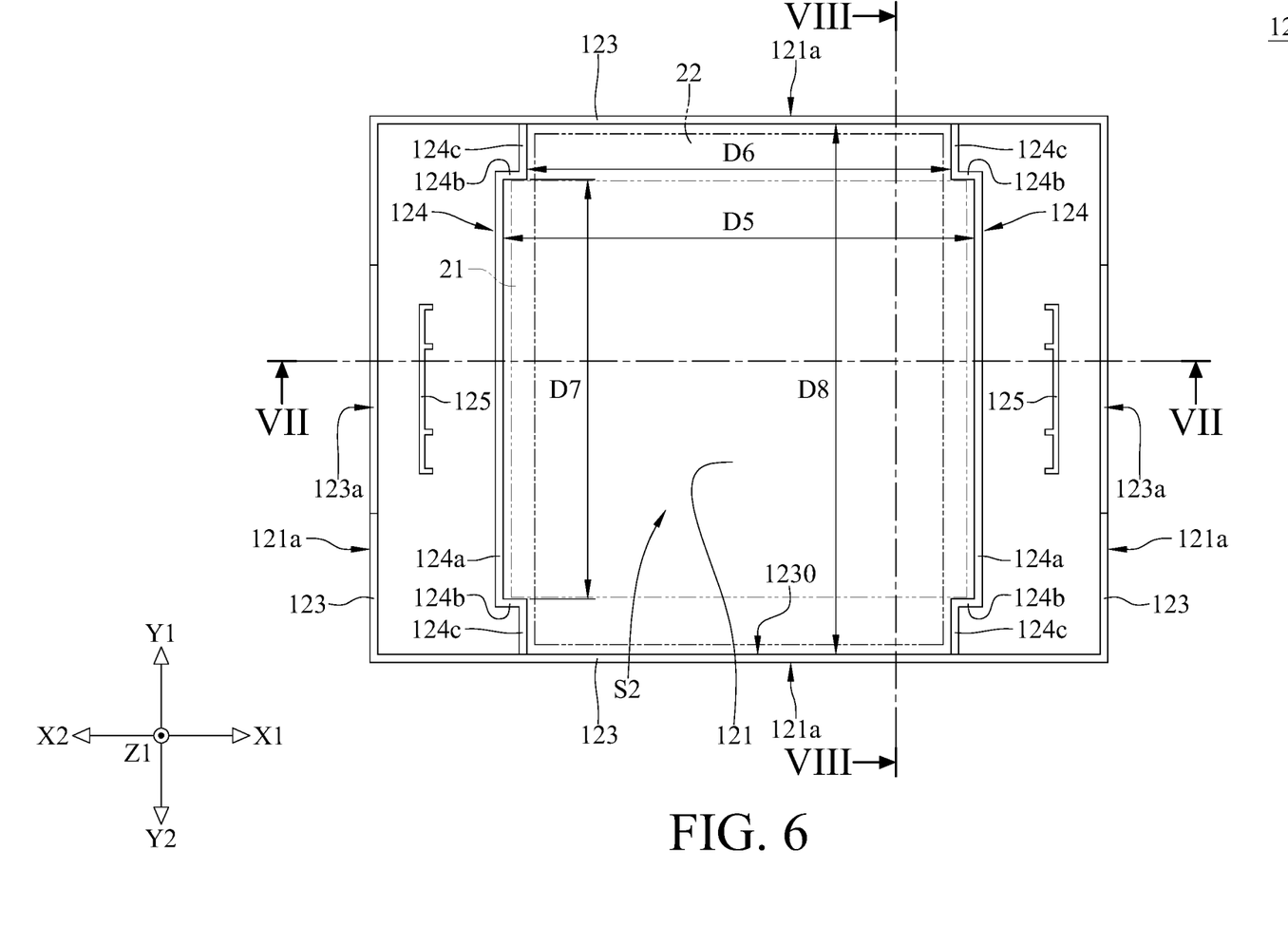
FIG. 6 is a top view of one of add-on containers of the battery accommodation module in FIG. 1.
Figure 7:
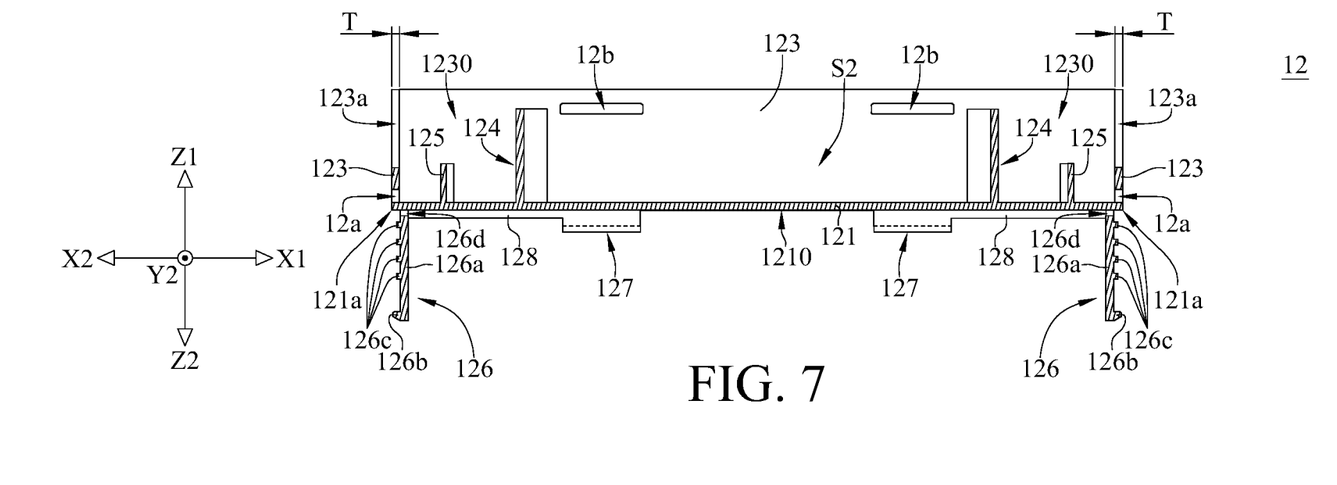
FIG. 7 is a cross-sectional view of the add-on container in FIG. 6 taken along line VII-VII.
Figure 8:
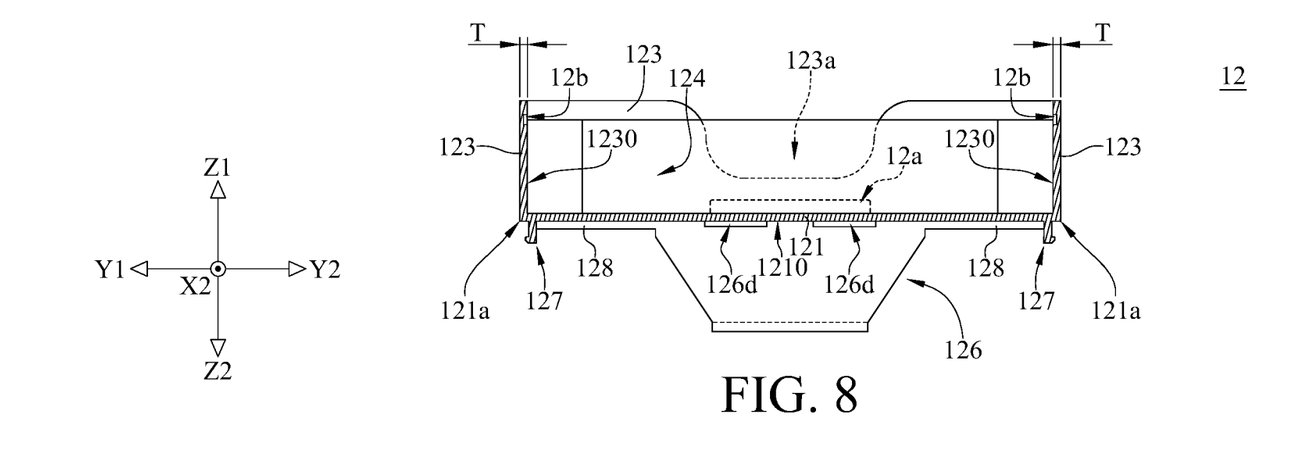
FIG. 8 is a cross-sectional view of the add-on container in FIG. 6 taken along line VIII-VIII.

Please refer to FIG. 6, FIG. 7, and FIG. 8, where FIG. 6 is a top view of one of add-on containers of the battery accommodation module in FIG. 1, FIG. 7 is a cross-sectional view of the add-on container in FIG. 6 taken along line VII-VII, and FIG. 8 is a cross-sectional view of the add-on container in FIG. 6 taken along line VIII-VIII. Note that the add-on container 12 and the add-on container 12' are substantially the same in configuration, thus only the detail descriptions of the add-on container 12 will be provided hereinafter.

The add-on container 12 includes a second base plate 121, a second lateral wall 123, two second retaining walls 124, two second stoppers 125, two first lower hooks 126, four first upper hooks 127, and a plurality of first reinforcement parts 128.

The second lateral wall 123 extends outward from an edge 121a of the second base plate 121 and are substantially perpendicular to the second base plate 121. The second retaining walls 124 are substantially perpendicular to the second base plate 121 and are arranged along the direction X1 or X2. The second lateral wall 123 surrounds the second retaining walls 124. The second retaining walls 124, the second base plate 121, and the second lateral wall 123 form the second accommodation space S2, where the second accommodation space S2 may have a cross shape since the specific shape of the second retaining walls 124.

In specific, the second retaining walls 124 each include a second central part 124a, two second bent parts 124b, and two second outward extension parts 124c. In each second retaining walls 124, the second central part 124a is connected to and located between the second bent parts 124b, and the second outward extension parts 124c are connected to the second central part 124a respectively via the second bent parts 124b, where the second bent parts 124b are substantially perpendicular to the second central part 124a and the second outward extension parts 124c. The distal ends (not numbered) of the second outward extension parts 124c are connected to the second lateral wall 123.

As shown in FIG. 6, in the direction X1 or X2, the second central parts 124a are spaced apart by a fifth distance D5, the second outward extension parts 124c of the different second retaining walls 124 are spaced apart by a sixth distance D6, where the sixth distance D6 is shorter than the fifth distance D5. In the direction Y1 or Y2, the second bent parts 124b of the same second retaining wall 124 are spaced apart by a seventh distance D7, the distal ends of the second outward extension parts 124c of the same second retaining wall 124 are spaced apart by an eighth distance D8, where the eighth distance D8 is longer than the seventh distance D7.

The above configuration and arrangement of the second retaining walls 124 allows the second accommodation space S2 to accommodate batteries of different sizes (e.g., the battery 21 and the battery 22 shown in dotted line). The fifth distance D5 and the seventh distance D7 may be respectively the same or slightly larger than the length and width of the battery 21, thus the battery 21 can be perfectly held and clamped by the second retaining walls 124. On the other hands, the eighth distance D8 and the sixth distance D6 may be respectively the same or slightly larger than the length and width of the battery 22, thus the battery 22 can be perfectly held and clamped by the second retaining walls 124 and the second lateral wall 123.

As such, the add-on container 12 is able to hold either the battery 21 or the battery 22 in position. As shown, the add-on container 12 can prevent the battery 21 or 22 from moving in directions of X1, X2, Y1, and Y2 and therefore secure its position in the second accommodation space S2. The second accommodation space S2 of the add-on container 12 can accommodate the same specification battery as the first accommodation space S1 of the base container 11 accommodates. However, the present disclosure is not limited thereto. In some other embodiments, the second accommodation space S2 may accommodate another battery with different specification from that of the battery in the first accommodation space S1.

As shown in FIG. 7 and FIG. 8, the add-on container 12 has two second lower slots 12a and two second upper slots 12b. The second lower slots 12a are through slots located on the second lateral wall 123. The second uppers slots 12b are blind slots formed on inner surfaces 1230 of the second lateral wall 123. Moreover, the second lateral wall 123 has two second cut-outs 123a. The second lower slots 12a are located between the second cut-outs 123a and the second base plate 121. In addition, each of the second stoppers 125 is substantially perpendicular to the second base plate 121 and is located between one of the second cut-outs 123a and the second retaining walls 124.

The first lower hooks 126, the first upper hooks 127, and the first reinforcement parts 128 are arranged on a bottom surface 1210 of the second base plate 1212 that faces away from the second lateral wall 123. The second lateral wall 123 has a thickness T. The first lower hooks 126, the first upper hooks 127, and the first reinforcement parts 128 are offset with respect to the second lateral wall 123 by at least a distance equal to or larger than the thickness T.

The first lower hooks 126 each include a first arm part 126a, a first engagement part 126b, and a plurality of first teeth 126c. The first arm parts 126a extend outward from the bottom surface 1210 of the second base plate 121. The first engagement part 126b is disposed at the distal end (not numbered) of the first arm part 126a that is located away from the second base plate 121. The first teeth 126c are disposed on the outer side of the first arm part 126a. The first lower hooks 126 each have two holes 126d formed on the first arm part 126a and located close to the second base plate 121, the existence of the holes 126d helps increase the flexibility of the first arm part 126a.

To install the add-on container 12 onto the base container 11, the add-on container 12 may be placed on the base container 11 along the direction Z2 to force the first engagement parts 126b of the first lower hooks 126 to engage into the first lower slots 11a; during this process, the first upper hooks 127 are engaged with the first upper slots 11b. By doing so, the first lateral wall 113 surrounds the first arm parts 126a and the first reinforcement parts 128, the first teeth 126c are located in the first cut-outs 113a, and the first arm parts 126a are located between the first stoppers 115 and the first lateral wall 113.

It is understood that pushing the first teeth 126c inward to force the first arm part 126a of the first lower hook 126 to deform can cause the first engagement part 126b to disengage from the first lower slot 11a. When the first engagement part 126b has been disengaged from the first lower slot 11a, the first stoppers 115 is able to stop the first arm part 126a so as to prevent it from overly deformed. When the push of the first teeth 126c removes the first engagement parts 126b from the first lower slots 11a, the first upper hooks 127 are disengaged from the base container 11, such that the add-on container 12 is allowed to be removed from the base container 11.

To install the add-on container 12' onto the add-on container 12, the add-on container 12' may be placed on the add-on container 12 along the direction Z2 to force the first engagement parts 126b of the first lower hooks 126 of the add-on container 12' to engage into the second lower slots 12a of the add-on container 12; during this process, the first upper hooks 127 of the add-on container 12' are engaged with the second upper slots 12b of the add-on container 12. By doing so, the second lateral wall 123 of the add-on container 12 surrounds the first arm parts 126a and the first reinforcement parts 128 of the add-on container 12', the first teeth 126c of the add-on container 12' are located in the second cut-outs 123a of the add-on container 12, and the first arm parts 126a of the add-on container 12' are located between the second stoppers 125 and the second lateral wall 123 of the add-on container 12.

It is understood that pushing the first teeth 126c of the add-on container 12' inward to force the first arm part 126a of the first lower hook 126 of the add-on container 12' to deform can cause the first engagement part 126b of the add-on container 12' to disengage from the second lower slots 12a of the add-on container 12. When the first engagement part 126b of the add-on container 12' has been disengaged from the second lower slots 12a of the add-on container 12, the second stopper 125 of the add-on container 12 is able to stop the first arm parts 126a of the add-on container 12' so as to prevent it from overly deformed. When the push of the first teeth 126c of the add-on container 12' removes the first engagement parts 126b of the add-on container 12' from the second lower slots 12a of the add-on container 12, the first upper hooks 127 of the add-on container 12' are disengaged from the add-on container 12, such that the add-on container 12' is allowed to be removed from the add-on container 12.

Figure 9:
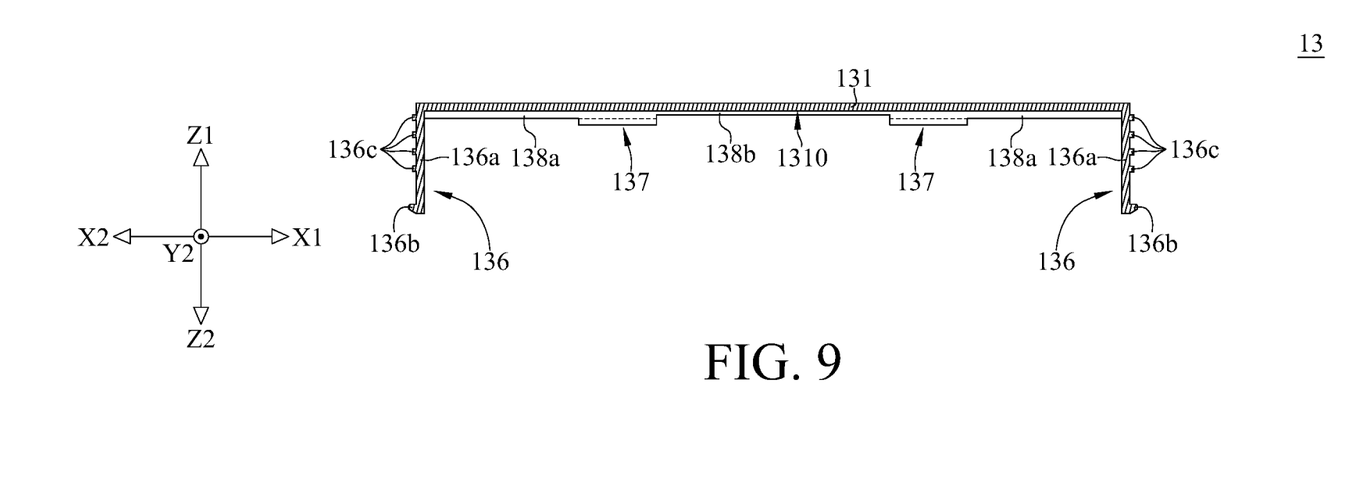
FIG. 9 is a cross-sectional view of a cover of the battery accommodation module in FIG. 2 taken along line IX-IX.
Figure 10:
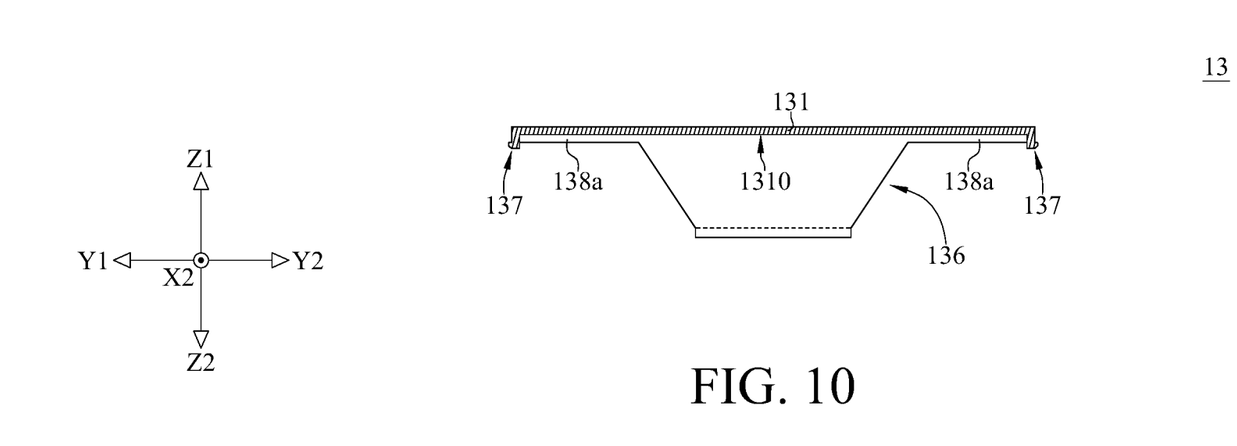
FIG. 10 is a cross-sectional view of the cover of the battery accommodation module in FIG. 2 taken along line X-X.

Please refer to FIG. 9 and FIG. 10, where FIG. 9 is a cross-sectional view of a cover of the battery accommodation module in FIG. 1 taken along line IX-IX, and FIG. 10 is a cross-sectional view of the cover of the battery accommodation module in FIG. 1 taken along line X-X.

The cover 13 includes a main body 131, two second lower hooks 136, two second upper hooks 137, and a plurality of second reinforcement parts 138a and 138b. The second lower hooks 136, the second upper hooks 137, and the second reinforcement parts 138a and 138b are arranged on a bottom surface 1310 of the main body 131.

The second lower hooks 136 each include a second arm part 136a, a second engagement part 136b, and a plurality of second teeth 136c. The second arm parts 136a extend outward from the bottom surface 1310 of the main body 131. The second engagement part 136b is disposed at the distal end (not numbered) of the second arm part 136a that is located away from the main body 131. The second teeth 136c are disposed on the outer side of the second arm part 136a.

To install the cover 13 onto the add-on container 12', the cover 13 may be placed on the add-on container 12' along the direction Z2 to force the second engagement parts 136b of the second lower hooks 136 to engage into the second lower slots 12a of the add-on container 12'; during this process, the second upper hooks 137 are engaged with the second upper slots 12b of the add-on container 12'. By doing so, the second lateral wall 123 of the add-on container 12' surrounds the second arm parts 136a and the second reinforcement parts 138a and 138b, the second teeth 136c are located in the second cut-outs 123a of the add-on container 12', and the second arm parts 136a are located between the second stoppers 125 and sides of the second lateral wall 123 of the add-on container 12'.

It is understood that pushing the second teeth 136c inward to force the second arm parts 136a of the second lower hooks 136 to deform can cause the second engagement parts 136b to disengage from the second lower slots 12a of the add-on container 12'. When the second engagement part 136b has been disengaged from the second lower slots 12a of the add-on container 12', the second stopper 125 of the add-on container 12' is able to stop the second arm parts 136a so as to prevent it from overly deformed. When the push of the second teeth 136c removes the second engagement parts 136b from the second lower slots 12a of the add-on container 12', the second upper hooks 137 are disengaged from the add-on container 12', such that the cover 13 is allowed to be removed from the add-on container 12'. Note that the cover 13 may be installed on the base container 11 or the add-on container 12.

According to the battery accommodation module discussed above, by stacking one or more add-on containers on the base container, the space of the battery accommodation module for accommodating the batteries is adjustable, thereby capable of adjusting provided power according to actual requirements. Further, the cross-shape of the first accommodation space or the second accommodation space can match two kinds of batteries with two different specifications. That is, if the cross-shapes of the first accommodation space and the second accommodation space are different from each other, the battery accommodation module can match four kinds of batteries with four different specifications.

In one embodiment of the present disclosure, the battery accommodation module is exemplarily disposed in a server for providing stable power. The server may be applied to artificial intelligence (AI) computing, edge computing, or internet of vehicles, or the server may be used as a 5G server or a cloud server.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A battery accommodation module, configured to accommodate a plurality of batteries, and the battery accommodation module comprising:
   a base container, having a first accommodation space configured to accommodate one of the plurality of batteries, wherein the base container comprises:
   a first base plate;
   a first lateral wall, extending from the edge of the first base plate and standing on the first base plate; and
   two first retaining walls, respectively standing on the first base plate and arranged along a first direction, wherein the two first retaining walls are surrounded by the first lateral wall;
   wherein the two first retaining walls, the first base plate, and the first lateral wall together form the first accommodation space having a cross shape;
   wherein each of the two first retaining walls comprises a first central part, two first bent parts, and two first outward extension parts, the two first bent parts are connected to and located between the first central part and the two first outward extension parts;
   wherein the first outward extension parts have distal ends that are located away from the two first central parts and are connected to the first lateral wall;
   wherein the two first central parts are spaced apart from each other along the first direction by a first distance;
   wherein the first outward extension parts of the different first retaining walls are spaced apart from one another along the first direction by a second distance that is shorter than the first distance;
   wherein the two first bent parts of the same first retaining wall are spaced apart from each other along a second direction perpendicular to the first direction by a third distance;
   wherein the two distal ends of the two first outward extension parts of the same first retaining wall are spaced apart from each other along the second direction by a fourth distance that is longer than the third distance;
   wherein the first distance and the third distance match a first specification of the plurality of batteries in length and width, and the second distance and the fourth distance match a second specification of the plurality of batteries in length and width; and
   at least one add-on container, having a second accommodation space configured to accommodate another one of the plurality of batteries, wherein one of the at least one add-on container is detachably engaged with the base container to cover the first accommodation space.

2. The battery accommodation module according to claim 1, wherein the base container further comprises at least one mount tab, and the at least one mount tab is connected to an edge of the first base plate and is configured to be mounted on a casing of an electronic device.

3. The battery accommodation module according to claim 1, wherein the at least one add-on container comprises a second base plate, a second lateral wall, and two second retaining walls, the second lateral wall extends from an edge of the second base plate and stands on the second base plate, the two second retaining walls are respectively stand on the second base plate and are arranged along the first direction;

wherein the second lateral wall surrounds the two second retaining walls;

wherein the two second retaining walls, the second base plate, and the second lateral wall together form the second accommodation space having a cross shape;

wherein each of the two second retaining walls comprises a second central part, two second bent parts, and two second outward extension parts, the two second bent parts are connected to and located between the second central part and the two second outward extension parts;

wherein the second outward extension parts have distal ends that are located away from the two second central parts and are connected to the second lateral wall;

wherein the two second central parts are spaced apart from each other along the first direction by a fifth distance;

wherein the second outward extension parts of the different second retaining walls are spaced apart from one another along the first direction by a sixth distance that is shorter than the fifth distance;

wherein the two second bent parts of the same second retaining wall are spaced apart from each other along the second direction by a seventh distance;

wherein the two distal ends of the two second outward extension parts of the same second retaining wall are spaced apart from each other along the second direction by an eighth distance that is longer than the seventh distance;

wherein the fifth distance and the seventh distance match the first specification of the plurality of batteries in length and width, and the sixth distance and the eighth distance match the second specification of the plurality of batteries in length and width.

4. The battery accommodation module according to claim 3, wherein the base container has a first lower slot and a first upper slot that are located on the first lateral wall, and the at least one add-on container further comprises a first lower hook and a first upper hook that are disposed on a bottom surface of the second base plate that faces away from the second lateral wall; when the at least one add-on container is engaged with the base container, the first lower hook is engaged with the first lower slot, and the first upper hook is engaged with the first upper slot.

5. The battery accommodation module according to claim 4, wherein the first lateral wall has a cut-out, the first lower slot is located between the cut-out and the first base plate, the first lower hook comprises an arm part, an engagement part, and a plurality of teeth, the arm part extends from the bottom surface of the second base plate, the engagement part is disposed on a distal end of the arm part that is located away from the second base plate, and the plurality of teeth are disposed on an outer side of the arm part; when the at least one add-on container is engaged with the base container, the engagement part is located in the first lower slot, the first lateral wall surrounds the arm part, and the plurality of teeth are located in the cut-out.

6. The battery accommodation module according to claim 5, wherein the base container further comprises a stopper that stands on the first base plate and is located between the cut-out and the two first retaining walls; when the at least one add-on container is engaged with the base container, the arm part is located between the stopper and a side of the first lateral wall that is adjacent to the stopper.

7. The battery accommodation module according to claim 4, further comprising a cover detachably engaged with one of the at least one add-on container and covers the second accommodation space thereof, wherein the cover comprises a main body, a second lower hook and a second upper hook, the second lower hook and the second upper hook are disposed on a bottom surface of the main body, and the at least one add-on container has a second lower slot and a second upper slot that are located on the second lateral wall; when the cover is engaged with one of the at least one add-on container, the second lower hook is engaged with the second lower slot, and the second upper hook is engaged with the second upper slot.

8. The battery accommodation module according to claim 7, wherein the second lateral wall has a cut-out, the second lower slot is located between the cut-out and the second base plate, the second lower hook comprises an arm part, an engagement part, and a plurality of teeth, the arm part extends from the bottom surface of the main body, the engagement part is disposed on a distal end of the arm part that is located away from the main body, and the plurality of teeth are disposed on an outer side of the arm part; when the cover is engaged with one of the at least one add-on container, the engagement part is located in the second lower slot, the second lateral wall surrounds the arm part, and the plurality of teeth are located in the cut-out.

9. The battery accommodation module according to claim 8, wherein the at least one add-on container further comprises a stopper that stands on the second base plate and is located between the cut-out and the two second retaining walls; when the cover is engaged with one of the at least one add-on container, the arm part is located between the stopper and a side of the second lateral wall that is adjacent to the stopper.

* * * * *